(12) United States Patent
Stuart et al.

(10) Patent No.: US 11,753,939 B2
(45) Date of Patent: Sep. 12, 2023

(54) TURBOMACHINE WITH ALTERNATINGLY SPACED ROTOR BLADES

(71) Applicant: General Electric Company, Schenectady, NY (US)

(72) Inventors: Alan Roy Stuart, Cincinnati, OH (US); Tsuguji Nakano, West Chester, OH (US); Thomas Ory Moniz, Loveland, OH (US); Andrew Breeze-Stringfellow, Montgomery, OH (US); Richard Schmidt, Loveland, OH (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 16/280,531

(22) Filed: Feb. 20, 2019

(65) Prior Publication Data

US 2020/0263547 A1 Aug. 20, 2020

(51) Int. Cl.
*F01D 5/06* (2006.01)

(52) U.S. Cl.
CPC ............ *F01D 5/06* (2013.01); *F05D 2220/32* (2013.01)

(58) Field of Classification Search
CPC ..... F01D 1/18; F01D 1/20; F01D 1/24; F01D 1/26; F04D 19/024; F04D 19/026; F04D 25/028
See application file for complete search history.

(56) References Cited

U.S. PATENT DOCUMENTS

| | | |
|---|---|---|
| 3,363,831 A | 1/1968 | Garnier |
| 3,703,081 A | 11/1972 | Krebs et al. |
| 4,098,127 A | 7/1978 | Shiga et al. |
| 4,621,978 A | 11/1986 | Stuart |
| 4,790,133 A * | 12/1988 | Stuart ..................... F02C 3/067 415/65 |
| 4,860,537 A | 8/1989 | Taylor |
| 4,879,792 A | 11/1989 | O'Connor |
| 4,969,325 A | 11/1990 | Adamson et al. |
| 4,976,102 A | 12/1990 | Taylor |
| 5,167,167 A | 12/1992 | Tiernan, Jr. et al. |
| 5,272,868 A | 12/1993 | Ciokajlo et al. |
| 5,537,861 A | 7/1996 | Seitelman et al. |
| 5,724,271 A | 3/1998 | Bankert et al. |
| 6,126,391 A | 10/2000 | Atraghji et al. |
| 6,619,030 B1 | 9/2003 | Seda et al. |
| 6,666,017 B2 | 12/2003 | Prentice et al. |
| 6,739,120 B2 | 5/2004 | Moniz et al. |

(Continued)

*Primary Examiner* — Woody A Lee, Jr.
*Assistant Examiner* — Cameron A Corday
(74) *Attorney, Agent, or Firm* — Dority & Manning, P.A.

(57) ABSTRACT

A gas turbine engine is provided including a turbine section including a turbine having a plurality of first speed turbine rotor blades; a compressor section including a compressor having a plurality of first speed compressor rotor blades and a plurality of second speed compressor rotor blades; a gearbox; and a first spool rotatable by the plurality of first speed turbine rotor blades, the first spool coupled to the plurality of first speed compressor rotor blades for driving the plurality of first speed compressor rotor blades in a first direction and to the plurality of second speed compressor rotor blades across the gearbox for driving the plurality of second speed compressor rotor blades in a second direction, opposite the first direction.

11 Claims, 6 Drawing Sheets

(56) References Cited

U.S. PATENT DOCUMENTS

| | | |
|---|---|---|
| 6,976,679 B2 | 12/2005 | Goss et al. |
| 7,195,446 B2 | 3/2007 | Seda et al. |
| 7,458,202 B2 | 12/2008 | Moniz et al. |
| 7,490,461 B2 | 2/2009 | Moniz et al. |
| 7,493,753 B2 | 2/2009 | Moniz et al. |
| 7,854,584 B2 | 12/2010 | Lusted et al. |
| 7,905,083 B2 | 3/2011 | Orlando et al. |
| 7,921,634 B2 | 4/2011 | Orlando et al. |
| 7,937,927 B2 | 5/2011 | Suciu et al. |
| 7,966,806 B2 | 6/2011 | Henry et al. |
| 8,172,512 B2 | 5/2012 | Short et al. |
| 8,736,120 B2 | 5/2014 | Maeda et al. |
| 8,784,045 B2 | 7/2014 | Zoric et al. |
| 8,887,564 B2 | 11/2014 | Harrison |
| 8,950,171 B2 | 2/2015 | Suciu et al. |
| 9,028,200 B2 | 5/2015 | Suciu et al. |
| 9,080,512 B2 | 7/2015 | Suciu et al. |
| 9,217,331 B1 | 12/2015 | Yellapragada et al. |
| 9,228,535 B2 * | 1/2016 | Magowan ............... F02C 3/067 |
| 9,525,321 B2 | 12/2016 | Yamanaka et al. |
| 9,664,070 B1 * | 5/2017 | Clauson ................. F02C 7/275 |
| 9,689,314 B2 | 6/2017 | Lemarchand et al. |
| 9,695,751 B2 | 7/2017 | Kupratis et al. |
| 9,718,536 B2 | 8/2017 | Danielson et al. |
| 9,885,249 B2 | 2/2018 | Munsell et al. |
| 10,047,608 B2 | 8/2018 | Phylip-Jones et al. |
| 10,060,357 B2 | 8/2018 | Adams et al. |
| 2006/0093469 A1 * | 5/2006 | Moniz ..................... F02K 3/072 |
| | | 415/68 |
| 2008/0148707 A1 * | 6/2008 | Schilling .................. F02C 7/36 |
| | | 60/39.162 |
| 2009/0188334 A1 | 7/2009 | Merry et al. |
| 2010/0196139 A1 | 8/2010 | Beeck et al. |
| 2015/0354502 A1 | 12/2015 | Kuhne et al. |
| 2016/0222815 A1 | 8/2016 | Schwarz et al. |
| 2016/0298539 A1 | 10/2016 | Roberge |
| 2016/0298751 A1 | 10/2016 | Mccune |
| 2017/0145956 A1 | 5/2017 | Miller et al. |
| 2017/0314418 A1 | 11/2017 | Lighty et al. |
| 2018/0058569 A1 | 3/2018 | Slayter et al. |
| 2018/0094589 A1 | 4/2018 | Anker et al. |
| 2018/0128168 A1 | 5/2018 | Suciu et al. |
| 2018/0141643 A1 | 5/2018 | Fages |
| 2018/0163845 A1 | 6/2018 | van der Merwe et al. |
| 2018/0202367 A1 | 7/2018 | Suciu et al. |
| 2018/0209290 A1 | 7/2018 | Port |
| 2018/0209335 A1 | 7/2018 | Stuart et al. |
| 2018/0223732 A1 | 8/2018 | Clements et al. |
| 2018/0274390 A1 | 9/2018 | Clauson et al. |
| 2018/0274527 A1 | 9/2018 | Snell |

* cited by examiner

TURBOMACHINE WITH ALTERNATINGLY SPACED ROTOR BLADES

FIELD

The present subject matter relates generally to a turbomachine, and more particularly, to a turbomachine having alternatingly spaced rotor blades.

BACKGROUND

Gas turbine engines generally include a turbine section downstream of a combustion section that is rotatable with a compressor section to rotate and operate the gas turbine engine to generate power, such as propulsive thrust. Certain gas turbine engines further include a fan driven by a turbine within the turbine section, such as a low pressure turbine of the turbine section.

In order to increase an efficiency of the fan, at least certain recent gas turbine engines provide a reduction gearbox to reduce a rotational speed of the fan relative to the turbine driving the fan. This gearbox must be a relatively robust gearbox given that an entirety of the power transferred to the fan is provided across the gearbox. Further, relatively robust thrust bearings must be provided for the fan to facilitate the thrust forces on shaft driving the fan (as such thrust forces cannot be offset across the gearbox).

As such, these gearbox and bearing(s) may be heavy and relatively expensive. Accordingly, a gas turbine engine capable of having a fan being driven at a reduced rotational speed, while allowing for a lighter or less expensive gearbox would be useful, and further without requiring the relatively robust thrust bearings would also be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine is provided. The gas turbine engine includes a turbine section including a turbine having a plurality of first speed turbine rotor blades; a compressor section including a compressor having a plurality of first speed compressor rotor blades and a plurality of second speed compressor rotor blades; a gearbox; and a first spool rotatable by the plurality of first speed turbine rotor blades, the first spool coupled to the plurality of first speed compressor rotor blades for driving the plurality of first speed compressor rotor blades in a first direction and to the plurality of second speed compressor rotor blades across the gearbox for driving the plurality of second speed compressor rotor blades in a second direction, opposite the first direction.

In certain exemplary embodiments the gas turbine engine further includes a fan section including a fan, wherein the plurality of second speed compressor rotor blades is further coupled to the fan for adding power to the fan such that the first spool is further configured for driving the fan across the plurality of second speed compressor rotor blades.

For example, in certain exemplary embodiments the plurality of second speed compressor rotor blades comprises a forward-most stage of compressor rotor blades and an aft-most stage of compressor rotor blades, wherein the forward-most stage of compressor rotor blades is coupled to the fan, and wherein the aft-most stage of compressor rotor blades is coupled to the first spool through the gearbox.

In certain exemplary embodiments the plurality of first speed compressor rotor blades and the plurality of second speed compressor rotor blades are alternatingly spaced along an axial direction of the gas turbine engine.

In certain exemplary embodiments the plurality of first speed turbine rotor blades is a plurality of intermediate speed turbine rotor blades, wherein the plurality of first speed compressor rotor blades is a plurality of intermediate speed compressor rotor blades, and wherein the plurality of second speed compressor rotor blades is a plurality of low-speed compressor rotor blades.

In certain exemplary embodiments the turbine of the turbine section further includes a plurality of second speed turbine rotor blades, and wherein the plurality of first speed turbine rotor blades is configured to rotate in an opposite circumferential direction than the plurality of second speed turbine rotor blades.

For example, in certain exemplary embodiments the plurality of first speed turbine rotor blades and the plurality of second speed turbine rotor blades are alternatingly spaced along an axial direction of the gas turbine engine.

For example, in certain exemplary embodiments the gas turbine engine further includes a fan section including a fan; and a second spool rotatable by the plurality of second speed turbine rotor blades, wherein the second spool is coupled to the fan for driving the fan.

For example, in certain exemplary embodiments the gas turbine engine further includes a compressor frame member positioned downstream of the compressor; a support member coupled to the compressor frame and coupled to the gearbox; a first bearing positioned between the support member and the first spool for supporting the first spool; and a second bearing positioned between the first spool and the second spool and substantially aligned with the first bearing along an axial direction of the gas turbine engine.

In certain exemplary embodiments the compressor is a low pressure compressor, wherein the compressor section further comprises a high pressure compressor positioned downstream of the low pressure compressor, wherein the high pressure compressor includes a plurality of first speed HP compressor rotor blades and a plurality of third speed HP compressor rotor blades, and wherein the plurality of first speed HP compressor rotor blades is coupled to the first spool.

For example, in certain exemplary embodiments the turbine is a low pressure turbine, wherein the turbine section further includes a high pressure turbine, wherein the high pressure turbine includes a plurality of third speed HP turbine rotor blades, and wherein the gas turbine engine further includes: a third spool rotatable by the plurality of third speed HP turbine rotor blades, the third spool coupled to the plurality of third speed HP compressor rotor blades for driving the plurality of third speed HP compressor rotor blades.

For example, in certain exemplary embodiments the plurality of third speed HP compressor rotor blades and the plurality of first speed HP compressor rotor blades are alternatingly spaced along an axial direction of the gas turbine engine.

In certain exemplary embodiments the turbine is a low pressure turbine, wherein the turbine section further includes a high pressure turbine, and wherein the gas turbine engine further includes: a third spool rotatable by the plurality of third speed HP turbine rotor blades; and an accessory drive system including an accessory gearbox and an accessory drive member, the accessory drive member drivingly coupled to the high pressure turbine at a location aft of the high pressure turbine.

In an exemplary embodiment of the present disclosure, a gas turbine engine is provided. The gas turbine engine defines an axial direction. The gas turbine engine includes a turbine section including a turbine having a plurality of first speed turbine rotor blades; a compressor section including a compressor having a plurality of first speed compressor rotor blades and a plurality of second speed compressor rotor blades, the plurality of first speed compressor rotor blades alternatingly spaced with the plurality of second speed compressor rotor blades along the axial direction; a fan section including a fan; and a first spool rotatable by the plurality of first speed turbine rotor blades and coupled to the plurality of first speed compressor rotor blades for driving the plurality of first speed compressor rotor blades, coupled to the plurality of second speed compressor rotor blades for driving the plurality of second speed compressor rotor blades, and coupled to the fan for driving the fan.

In certain exemplary embodiments the gas turbine engine further includes a gearbox, wherein the first spool is coupled to the plurality of second speed compressor rotor blades across the gearbox.

For example, in certain exemplary embodiments the first spool is coupled to the fan through the plurality of second speed compressor rotor blades.

For example, in certain exemplary embodiments the plurality of second speed compressor rotor blades comprises a forward-most stage of compressor rotor blades and an aft-most stage of compressor rotor blades, wherein the forward-most stage of compressor rotor blades is coupled to the fan, and wherein the aft-most stage of compressor rotor blades is coupled to the first spool through the gearbox.

In certain exemplary embodiments the gas turbine engine further includes a plurality of second speed turbine rotor blades, wherein the plurality of first speed turbine rotor blades are alternatingly spaced with the plurality of second speed turbine rotor blades along the axial direction.

For example, in certain exemplary embodiments the gas turbine engine further includes a second spool coupled to and rotatable with the plurality of second speed turbine rotor blades and the fan for driving the fan, wherein the plurality of second speed compressor rotor blades are further coupled to the fan for driving the fan.

In certain exemplary embodiments the gas turbine engine further includes a plurality of second speed turbine rotor blades, and wherein the plurality of first speed turbine rotor blades is configured to rotate in an opposite circumferential direction than the plurality of second speed turbine rotor blades.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
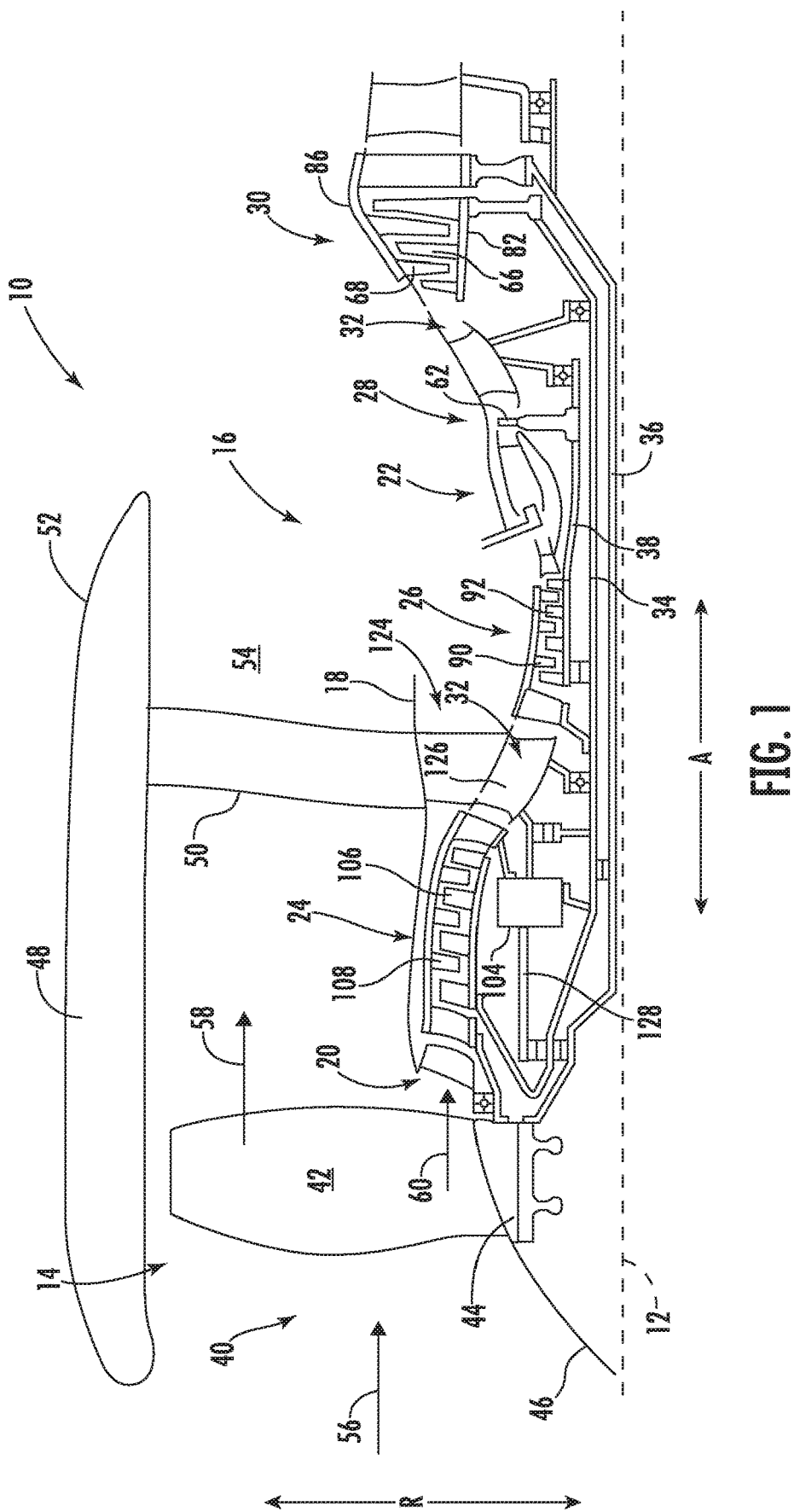
FIG. 1 is a schematic cross sectional view of an exemplary gas turbine engine incorporating exemplary aspects of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a gas turbine engine, such as a turbofan engine, having a fan section, a compressor section, a combustion section, and a turbine section, with a unique driving architecture for the compressor section, the fan section, or both. For example, in certain embodiments of the present disclosure, the compressor section includes a compressor having a plurality of first speed compressor rotor blades and a plurality of second speed compressor rotor blades. A spool of the gas turbine engine may be rotatable by a turbine of the turbine section, and further may be coupled to the plurality of first speed compressor rotor blades and to the plurality of second speed compressor rotor blades. More particularly, the spool may be coupled directly to the plurality of first speed compressor rotor blades to drive the plurality of first speed compressor rotor blades in a first direction and may further be coupled to the plurality of second speed compressor rotor blades across a gearbox for driving the plurality of second speed compressor rotor blades and a second direction, opposite the first direction.

Additionally, in certain embodiments, the plurality of second speed compressor rotor blades may further be coupled to a fan of the fan section, such that rotating the plurality of second speed compressor rotor blades by the spool across the gearbox also drives the fan.

Notably, in certain embodiments, the spool may be a first spool rotatable by a plurality of first speed turbine rotor blades of the turbine, and the gas turbine engine may further include a second spool rotatable by a plurality of second speed turbine rotor blades of the turbine. The second spool may directly drive the fan along with the first spool such that power from both the first spool and second spool is added to the fan.

Referring now to the drawings, wherein identical numerals indicate the same elements throughout the Figs., FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. Although only a portion of the outer casing 18 is depicted in FIG. 1, it will generally be appreciated that the outer casing 18 encases, in serial flow relationship, a compressor section including a compressor, a combustion section 22 including a combustor, and a turbine section including a turbine. More specifically, for the embodiment shown, the compressor section includes a low pressure (LP) compressor 24 and a high pressure (HP) compressor 26, with the HP compressor 26 located downstream of the LP compressor 24; and the turbine section includes a high pressure (HP) turbine 28 and a low pressure (LP) turbine 30, with the LP turbine 30 located downstream of the HP turbine 28. The compressor section, combustion section 22, and turbine section together define a core air flowpath 32 extending from the annular inlet 20 through the LP compressor 24, HP compressor 26, combustion section 22, HP turbine 28, and LP turbine 30.

As will be explained in greater detail below, the exemplary turbofan engine 10 depicted is a three-speed turbofan engine. For example, one or more of the turbines and compressors within the turbine section and compressor section, respectively, include: rotor blades rotating at a first speed, which may generally be an intermediate-speed; rotor blades rotating at a second speed, which may generally be a low-speed; and a rotor blades rotating at a third speed, which may generally be a high-speed. As such, it will be appreciated that the exemplary turbofan engine depicted generally also includes a first spool, or intermediate-speed spool 34, a second spool, or low-speed spool 36, and a third spool, or high-speed spool 38.

It will be appreciated that as used herein, the terms "high pressure" and "low pressure" are generally relative terms, and do not refer to or require any specific pressure or pressure ratio. Similarly, it will be appreciated that as used herein, the terms "high-speed," "low-speed," and "intermediate-speed" are also generally relative terms, and do not refer to or require any specific rotational speed.

Referring still to FIG. 1, for the embodiment depicted, the fan section 14 includes a fan having a plurality of fan blades 42 coupled to a disk 44 in a spaced apart manner. As depicted, the fan blades 42 extend outwardly from the disk 44 generally along the radial direction R. The fan blades 42 and disk 44 are together rotatable about the longitudinal axis 12. As will be explained in greater detail below, for the embodiment shown, the fan blades 42 and disk 44 are together rotatable about the longitudinal axis 12 by the low-speed spool 36 and the intermediate-speed spool 34.

Additionally, the disk 44 is covered by rotatable spinner cone 46 aerodynamically contoured to promote an airflow through the plurality of fan blades 42. The exemplary fan section 14 includes an annular fan casing or outer nacelle 48 that circumferentially surrounds the fan 40 and/or at least a portion of the turbomachine 16. The nacelle 48 is supported relative to the turbomachine 16 by a plurality of circumferentially-spaced outlet guide vanes 50. Moreover, a downstream section 52 of the nacelle 48 extends over an outer portion of the turbomachine 16 so as to define a bypass airflow passage 54 therebetween.

During operation of the turbofan engine 10, a volume of air 56 enters the turbofan 10 through an associated inlet of the nacelle 48 and/or fan section 14. As the volume of air 56 passes across the fan blades 42, a first portion of the air 56 as indicated by arrows 58 is directed or routed into the bypass airflow passage 56 and a second portion of the air 56 as indicated by arrow 60 is directed or routed into turbomachine 16. The ratio between the first portion of air 58 and the second portion of air 60 is commonly known as a bypass ratio. The pressure of the second portion of air 60 is then increased as it is routed through the LP compressor 24 and HP compressor 26 and into the combustion section 22, where it is mixed with fuel and burned to provide combustion gases through the turbine section. Operation of the compressor section will be discussed in greater detail below, with reference to, e.g., FIG. 4.

Figure 2:
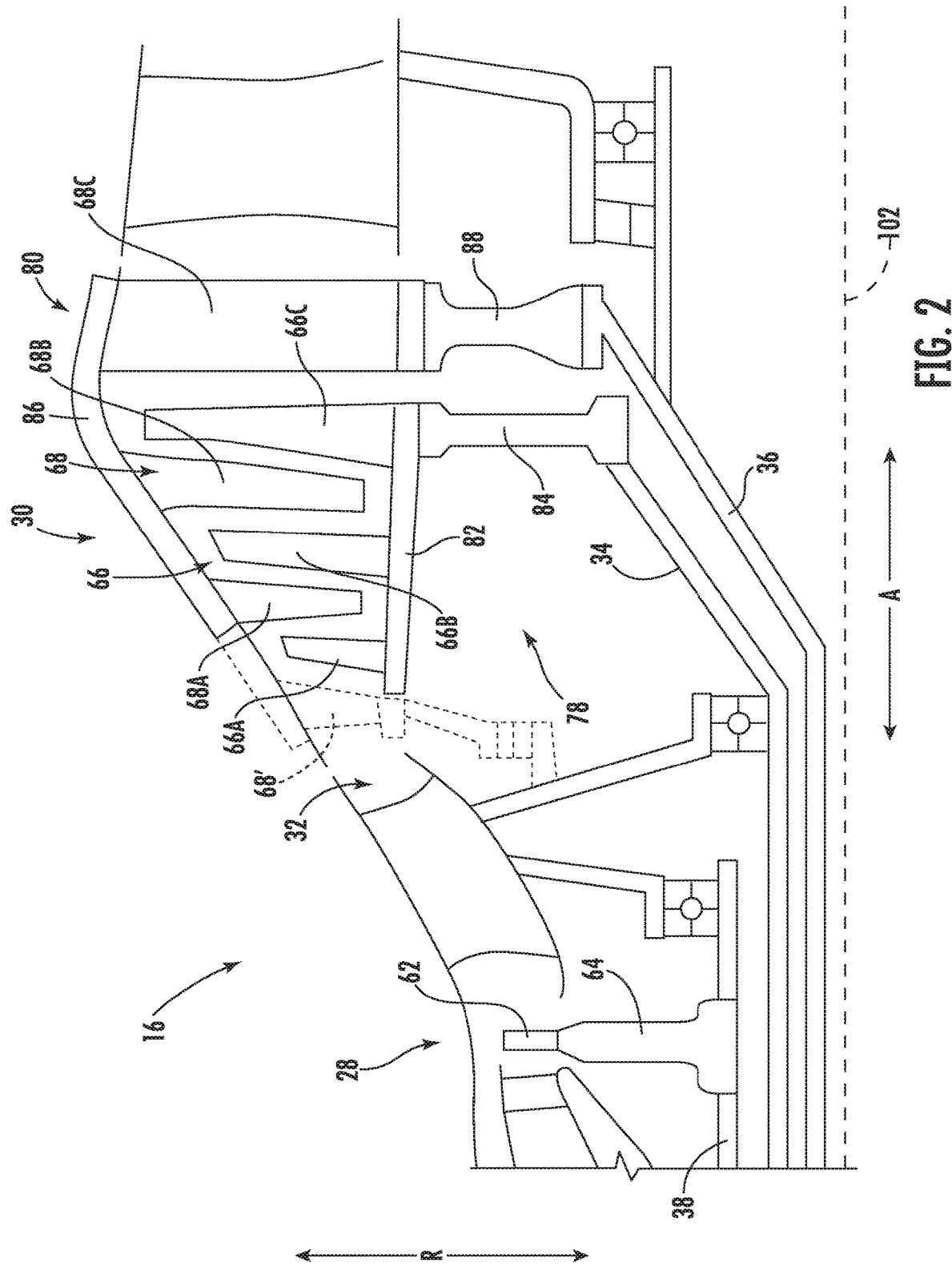
FIG. 2 is a close-up, schematic, cross sectional view of a turbine section of the exemplary gas turbine engine of FIG. 1.

Referring still to FIG. 1, and now also to FIG. 2, providing a close-up view of the turbine section of the exemplary turbofan engine 10 of FIG. 1, the HP turbine 28 includes a plurality of high-speed HP turbine rotor blades 62. More specifically, for the embodiment shown, the HP turbine 28 is a single stage turbine, including a single stage of high-speed HP turbine rotor blades 62. Each of the plurality of high-speed HP turbine rotor blades 62 are coupled to a rotor disk 64, which in turn is coupled to the high-speed spool 38. In such a manner, it will be appreciated that the plurality of high-speed HP turbine rotor blades 62 may extract energy from combustion gases from the combustion section 22 during operation and transfer such energy to the high-speed spool 38, such that the high-speed spool 38 is rotatable by the high-speed HP turbine rotor blades 62 of the HP turbine 28 and may drive operations within the compressor section, as is discussed below.

The combustion gases are then routed through the LP turbine 30 where a second portion of thermal and kinetic energy is extracted from the combustion gases via sequential stages of LP turbine rotor blades. Notably, for the embodiment shown, the LP turbine 30 includes a plurality of first speed LP turbine rotor blades and a plurality of second speed LP turbine rotor blades. The plurality of first speed turbine rotor blades of the LP turbine is configured to rotate in an opposite circumferential direction than the plurality of second speed LP turbine rotor blades. More specifically, for the embodiment shown the plurality of first speed LP turbine rotor blades is a plurality of intermediate-speed LP turbine rotor blades 66, and the plurality of second speed LP turbine rotor blades is a plurality of low-speed LP turbine rotor blades 68. As such, the plurality of intermediate-speed LP turbine rotor blades 66 may be coupled to the intermediate-speed spool 34, such that the intermediate-speed spool 34 is rotatable by the plurality of intermediate-speed LP turbine rotor blades 66. Similarly, the plurality of low-speed LP turbine rotor blades 68 is coupled to the low-speed spool 36, such that the low-speed spool 36 is rotatable by the plurality of low-speed LP turbine rotor blades 68.

Figure 3:
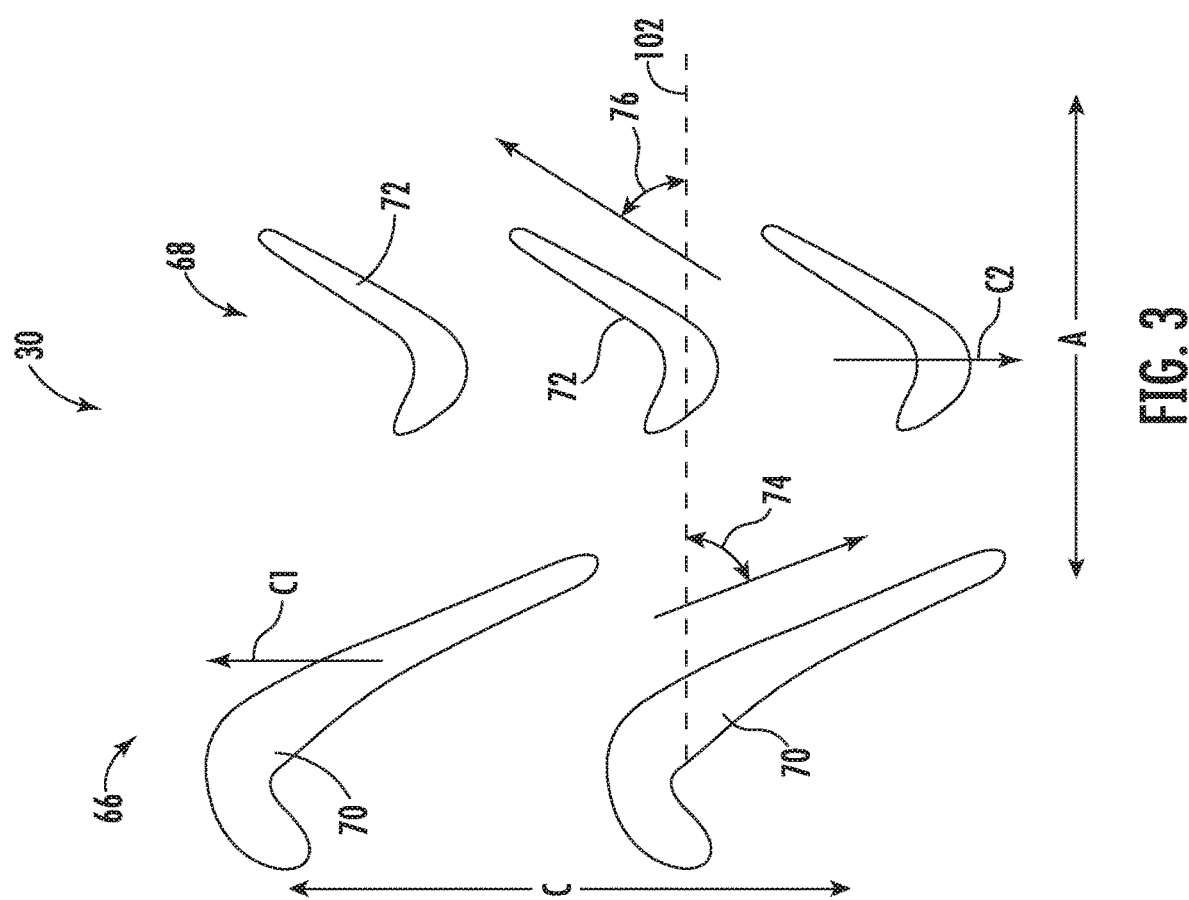
FIG. 3 is a cross sectional view depicting exemplary blade pitch angles of a turbine of a turbine section in accordance with an exemplary embodiment of the present disclosure.

More specifically, referring briefly to FIG. 3, an orientation of the plurality of intermediate-speed LP turbine rotor blades 66 and low-speed LP turbine rotor blades 68 is generally provided. More specifically, still, the embodiment of FIG. 3 generally depicts a first stage of the plurality of intermediate-speed LP turbine rotor blades 66 and a first stage of the plurality of low-speed LP turbine rotor blades 68. In the embodiment shown, the intermediate-speed LP turbine rotor blades 66 are configured to rotate in a first circumferential direction C1, while the low-speed LP turbine rotor blades 68 are configured to rotate in a second circumferential direction C2. It should be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Referring still to FIG. 3, it will further be appreciated that for the embodiment depicted, each turbine rotor blade of the intermediate-speed LP turbine rotor blades 66 includes an airfoil 70, and similarly, each turbine rotor blade of the low-speed LP turbine rotor blades 68 includes an airfoil 72. The airfoils 70 each define an exit angle 74, and similarly the airfoils 72 each define an exit angle 76. The exit angles 74, 76 of the airfoils 70, 72, respectively, as well as the pressure and suction sides (not labeled) of such airfoils 70, 72, respectively, and other features of the turbofan engine 10, may cause the intermediate-speed LP turbine rotor blades 66 and the low-speed LP turbine rotor blades 68 to rotate in the first and second circumferential directions C1, C2, respectively. It will be appreciated, however, that in other embodiments, the airfoils 70, 72 may have any other suitable configuration.

Referring now back to FIGS. 1 and 2, it will further be appreciated that the plurality of intermediate-speed LP turbine rotor blades 66 and the plurality of low-speed LP turbine rotor blades 68 are alternatingly spaced along the axial direction A of the turbofan engine 10. As used herein, the term "alternatingly spaced along the axial direction A" refers to the plurality of intermediate-speed LP turbine rotor blades 66 including at least one turbine rotor blade positioned along the axial direction A between two axially spaced turbine rotor blades of the plurality of low-speed LP turbine rotor blades 68. For example, for the embodiment depicted, the plurality of intermediate-speed LP turbine rotor blades 66 includes three sequential stages of intermediate-speed LP turbine rotor blades 66, and similarly, the plurality of low-speed LP turbine rotor blades 68 includes three sequential stages of low-speed LP turbine rotor blades 68. A first stage of intermediate-speed LP turbine rotor blades 66A is positioned forward of the plurality of low-speed LP turbine rotor blades 68, a second stage of intermediate-speed LP turbine rotor blades 66B is positioned between a first stage of low-speed LP turbine rotor blades 68A and a second stage of low-speed LP turbine rotor blades 68B along the axial direction A, and a third stage of intermediate-speed LP turbine rotor blades 66C is positioned between the second stage of low-speed LP turbine rotor blades 68B and a third stage of low-speed LP turbine rotor blades 68C along the axial direction A. It will be appreciated, however, that in other exemplary embodiments, the intermediate-speed LP turbine rotor blades 66 and low-speed LP turbine rotor blades 68 may be arranged in any other suitable, alternatingly spaced manner and including any suitable number of stages of turbine rotor blades. For example, as is depicted in phantom, in certain embodiments the plurality of low-speed LP turbine rotor blades 68 may include a stage of LP turbine rotor blades (labeled 68' in FIG. 2) located forward of the first stage of low-speed LP turbine rotor blades 68A (in which case the stage labeled the "first" stage may actually be the "second" stage and so forth) and forward of all of the intermediate-speed LP turbine rotor blades 66. With such an alternative embodiment, the low-speed turbine rotor blades 68 may additionally or alternatively be supported through the stage 68' through a bearing 226' as part of bearing assembly 226, discussed below.

Furthermore, for the embodiment shown, each of the plurality of stages of intermediate-speed LP turbine rotor blades 66 are coupled to a first LP turbine connection assembly 78 and each of the plurality of stages of low-speed LP turbine rotor blades 68 are coupled to a second LP turbine connection assembly 80. Each of the plurality of intermediate-speed LP turbine rotor blades 66 are coupled to the first LP turbine connection assembly 78 at their respective radially inner ends, and similarly, each of the plurality of low-speed LP turbine rotor blades 68 are coupled to the second LP turbine connection assembly 80 at their respective radially outer ends. More specifically, for the embodiment shown the first LP turbine connection assembly 78 includes an inner drum 82 and at least one rotor disk 84, with each of the plurality of intermediate-speed rotor blades of the LP turbine 30 coupled at a respective radially inner ends to the inner drum 82 and the inner drum coupled to the at least one rotor disk 84. Similarly, the second LP turbine connection assembly 80 includes an outer drum 86 and at least one rotor disk 88, with each of the plurality of low-speed LP turbine rotor blades 68 coupled at their respective radially outer ends to the outer drum 86 and the outer drum 86 couple to the at least one rotor disk 88 (through the third stage of low-speed LP turbine rotor blades 68C for the embodiment shown).

It will be appreciated, however, that the mounting/coupling configuration of the LP turbine 30 is provided by way of example only. In other exemplary embodiments, the first LP turbine connection assembly 78 and/or second LP turbine connection assembly 80 may have any other suitable configuration. For example, in other embodiments, one or both of the first LP turbine connection assembly 78 and second LP turbine connection assembly 80 may include any other suitable number of rotor discs, blisks, drums, etc., and may be coupled to the adjacent stages at their respective inner ends or outer ends.

Figure 4:
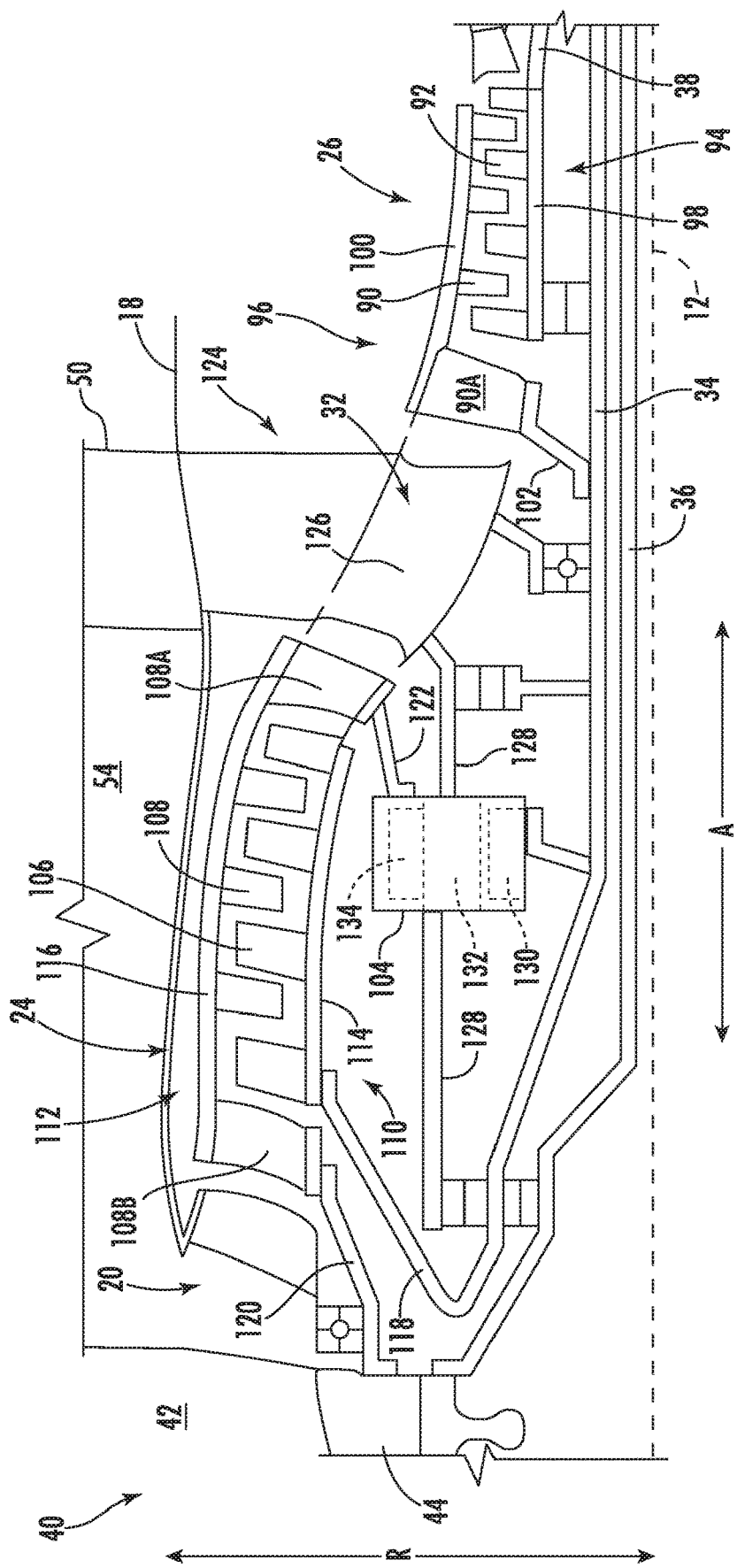
FIG. 4 is a close-up, schematic, cross sectional view of a compressor section of the exemplary gas turbine engine of FIG. 1.

Referring now still to FIG. 1 and now also to FIG. 4, operation of the compressor section and fan section 14 of the exemplary turbofan engine 10 will be described in greater detail.

As noted, the compressor section includes the LP compressor 24 and the HP compressor 26. Referring first specifically to the HP compressor 26, the HP compressor 26 includes a plurality of first speed HP compressor rotor blades and a plurality of third speed HP compressor rotor blades. For the embodiment shown, the plurality of first speed HP compressor rotor blades is a plurality of intermediate-speed HP compressor rotor blades 90 and the plurality of third speed HP compressor rotor blades is a plurality of high-speed HP compressor rotor blades 92. The high-speed spool 38 is coupled to the plurality of high-speed HP compressor rotor blades 92 for driving/rotating the plurality of high-speed HP compressor rotor blades 92. Similarly, the intermediate-speed spool 34 is coupled to the plurality of intermediate-speed HP compressor rotor blades 90 for driving/rotating the plurality of intermediate-speed HP compressor rotor blades 90.

Similar to the HP turbine 28, the plurality of high-speed HP compressor rotor blades 92 and the plurality of intermediate-speed HP compressor rotor blades 90 are alternatingly spaced along the axial direction A of the turbofan engine 10 and are configured to counterrotate. For example, the plurality of high-speed HP compressor rotor blades 92 and the plurality of intermediate-speed HP compressor rotor blades 90 may be configured in a similar manner as the intermediate-speed and low-speed LP turbine rotor blades 66, 68 depicted in FIG. 3.

Further, for the embodiment shown, the HP compressor 26 includes a first HP compressor connection assembly 94 for coupling each of the plurality of high-speed HP compressor rotor blades 92 and a second HP compressor connection assembly 96 for coupling each of the plurality of intermediate-speed HP compressor rotor blades 90 of the HP compressor 26. The first HP compressor connection assembly 94 generally includes an inner drum 98, with each of the plurality of high-speed HP compressor rotor blades 92 coupled to the inner drum 98 at their respective radially inner ends, and similarly, the second HP compressor connection assembly 96 generally includes an outer drum 100, with each of the plurality of immediate speed compressor rotor blades of the HP compressor 26 coupled to the outer drum 100 at their respective radially outer ends. Moreover, for the embodiment shown, the plurality of intermediate-speed HP compressor rotor blades 90 is coupled to the intermediate-speed spool 34 through a forwardmost stage of intermediate-speed HP compressor rotor blades 90A and an HP compressor connection member 102.

Further, as is also noted above, the compressor section further includes the LP compressor 24, and the turbomachine 16 further includes a gearbox 104. The LP compressor 24 generally includes a plurality of first speed LP compressor rotor blades and a plurality of second speed LP compressor rotor blades. The plurality of first speed LP compressor rotor blades is, for the embodiment shown, a plurality of intermediate-speed LP compressor rotor blades 106, and the plurality of second speed LP compressor rotor blades is, for the embodiment shown a plurality of low-speed LP compressor rotor blades 108. The intermediate-speed spool 34 is coupled to the plurality of intermediate-speed LP compressor rotor blades 106 for driving the plurality of intermediate-speed LP compressor rotor blades 106 in a first direction. The intermediate-speed spool 34 is further coupled to the plurality of low-speed LP compressor rotor blades 108 across the gearbox 104 for driving the plurality of low-speed LP compressor rotor blades 108 in a second direction, the second direction being opposite the first direction. In such a manner, the LP compressor 24 may also be referred to as a counterrotating LP compressor, e.g., with the plurality of intermediate-speed LP compressor rotor blades 106 and plurality of low-speed LP compressor rotor blades 108 configured in a similar manner as the high-speed and low-speed LP turbine rotor blades 66, 68 depicted in FIG. 3. For example, the first direction may be the same as the first circumferential direction C1 discussed above with reference to FIG. 3, and similarly, the second direction may be the same as the second circumferential direction C2 discussed above with reference to FIG. 3.

As with the counterrotating HP compressor 26 and LP turbine 30, the plurality of intermediate-speed LP compressor rotor blades 106 and low-speed LP compressor rotor blades 108 are alternatingly spaced along the axial direction A. Additionally, for the embodiment shown, the LP compressor 24 includes a first LP compressor connection assembly 110 for coupling each of the plurality of intermediate-speed LP compressor rotor blades 106 and a second LP compressor connection assembly 112 for coupling each of the plurality of low-speed LP compressor rotor blades 108. The first LP compressor connection assembly 110 generally includes an inner drum 114, with each of the plurality of intermediate-speed LP compressor rotor blades 106 coupled to the inner drum 114 at their respective radially inner ends, and similarly, the second LP compressor connection assembly 112 generally includes an outer drum 116, with each of the plurality of low-speed LP compressor rotor blades 108 coupled to the outer drum 116 at their respective radially outer ends.

More specifically, the first LP compressor connection assembly 110 further includes an intermediate-speed connection member 118 extending between the inner drum 82 and the intermediate-speed spool 34 and the second LP compressor connection assembly 112 further includes a forward low-speed connection member 120 and an aft low-speed connection member 122. Moreover, it will be appreciated that the turbofan engine 10 further includes a frame assembly 124, with the frame assembly 124 including a strut 126 (or rather a plurality of struts 126 spaced along the circumferential direction) extending through the core air flowpath 32 at a location downstream of the LP compressor 24 and upstream of the HP compressor 26. The frame assembly 124 further includes a frame member 128 coupled to the strut 126 and extending forward. The frame member 128, for the embodiment shown, and as will be discussed in greater detail below, extends through the gearbox 104 and is configured for mounting the gearbox 104 to the frame assembly 124. The intermediate-speed connection member 118 of the first LP compressor connection assembly 110 extends from the intermediate-speed spool 34 forward and around the frame member 128 to connect inner drum 114 (and the plurality of intermediate-speed LP compressor rotor blades 108) to the intermediate-speed spool 34.

The gearbox 104 generally includes a first gear, a second gear, and a third gear. More specifically, the gearbox 104 is generally configured as a planetary gear box, such that the first gear is a sun gear 130, the second gear is a planet gear 132 (or rather, a plurality of planet gears 132) and the third gear is a ring gear 134. As noted above, the plurality of low-speed LP compressor rotor blades 108 are driven by the intermediate-speed spool 34 across the gearbox 104. More specifically, the intermediate-speed spool 34 directly rotates the sun gear 130, and the aft low-speed connection member 122 couples the plurality of low-speed LP compressor rotor blades 108 to the ring gear 134, such that the ring gear 134 directly rotates the plurality of low-speed LP compressor rotor blades 108. The planet gear 132, or rather, the plurality of planet gears 132, are maintained stationary along the circumferential direction C through the mounting to the frame member 128. (Although not depicted, it will be appreciated that the frame member 128 may define a plurality of slots within which the planet gears 132 are positioned to allow the frame member 128 to extend through the gearbox 104.) In such a manner, it will be appreciated that the gearbox 104 facilitates a rotation of the low-speed LP compressor rotor blades 108 by the intermediate-speed spool 34, while reducing a rotational speed of the low-speed LP compressor rotor blades 108 relative to the intermediate-speed spool 34, and further reversing a rotational direction of the LP compressor 24 rotor blades relative to the intermediate-speed spool 34.

Further, it will be appreciated that for the embodiment shown the fan 40 of the fan section 14 is configured to be driven by both the low-speed spool 36 and the intermediate-speed spool 34, such that a driving power for the fan 40 is shared between these two spools 34, 36. More specifically, the low-speed spool 36, which is rotatable by the plurality of low-speed LP turbine rotor blades 68, is coupled to the fan 40 directly for driving the fan 40 at the same rotational speed and in the same rotational direction (e.g., without any gear reduction). Further, the plurality of low-speed LP compressor rotor blades 108 are also coupled to the fan 40 for adding power to the fan 40, such that the intermediate-speed spool 34 is also configured for driving the fan 40. However, the intermediate-speed spool 34 is coupled to the fan 40 across the gearbox 104 and the plurality of low-speed LP compressor rotor blades 108. More specifically, for the embodiment depicted, the intermediate-speed spool 34 is coupled to an aftmost stage of the low-speed LP compressor rotor blades 108A (across the sun gear, planet gears 132, and ring gear 134 of the gearbox 104 and the aft low-speed connection member 122), which is coupled to the outer drum 116, which is coupled to the forward low-speed connection member 120 (across a forwardmost stage of low-speed LP compressor rotor blades 108B), which is coupled to the fan 40.

In such a manner, it will be appreciated that the fan 40 is driven by both the intermediate-speed spool 34 and the low-speed spool 36 during operation. In such a manner, it will be appreciated that the gearbox 104 may not need to transfer all the power required for driving the fan 40 (as compared to traditional geared gas turbine engines). Such may result in less wear and tear on the gearbox 104, which may accordingly allow for a smaller, lighter, more compact, and less expensive gearbox 104. Further, utilizing an alternatingly spaced LP compressor 24 and/or an alternatingly spaced HP compressor 26 may allow for a much more efficient compressor section of the gas turbine engine, which may allow for a higher overall compressor ratio and/or a more compact compressor section. As such, the gas turbine engine may generally operate more efficiently.

Further, still, as the low speed spool 36 is providing a portion of the driving power for the fan 40 direction, and not through a gearbox, a portion of a forward thrust on the low speed spool 36 by the fan 40 may be offset by opposing axial forces on the low speed spool 36 by the LP turbine 30. Such may therefore allow for a lesser number of thrust bearings, or smaller thrust bearings, to be utilized to support the fan 40.

Figure 5:
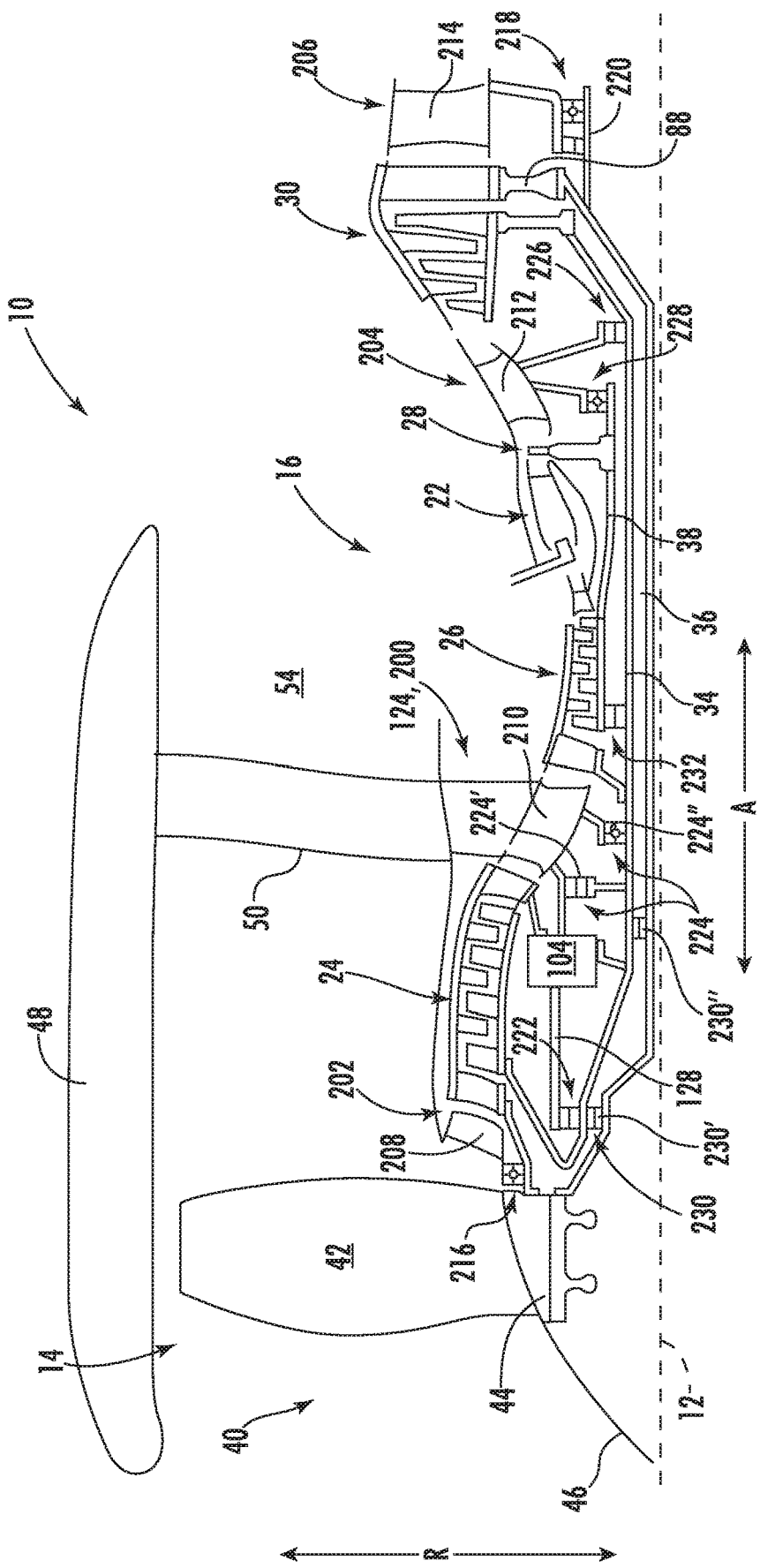
FIG. 5 is another schematic cross sectional view of the exemplary gas turbine engine of FIG. 1.

Referring now to FIG. 5, it will be appreciated that the exemplary turbofan engine 10 may have any suitable bearing configuration. FIG. 5 provides the same view of the exemplary turbofan engine 10 of FIG. 1, but with certain of the previously discussed reference numerals omitted for clarity.

As discussed above, it will be appreciated that the exemplary turbofan engine 10 generally includes the low-speed spool 36, the intermediate-speed spool 34 and the high-speed spool 38. Further, the frame assembly 124 described above is generally configured as a compressor center frame 200. The exemplary turbofan engine 10 depicted further includes a compressor forward frame 202, a turbine center frame 204, and a turbine rear frame 206. Each of these frames 200, 202, 204, 206 may generally include a strut extending through the core air flowpath 32. For example, the compressor forward frame 202 includes a forward strut 208 extending through the core air flowpath 32 at a location upstream of the LP compressor 24, the compressor center frame 200 includes a compressor center strut 210 (which is the same as the strut 126 discussed above) extending through the core air flowpath 32 at a location downstream of the LP compressor 24 and upstream of the HP compressor 26, the turbine center frame 204 includes a turbine center strut 212 extending through the core air flowpath 32 at a location downstream of the HP turbine 28 and upstream of the LP turbine 30, and the turbine rear frame 206 includes a turbine rear strut 214 extending through the core air flowpath 32 at a location downstream of the LP turbine 30.

Moreover, each of the above frames 200, 202, 204, 206 may generally be utilized for supporting one or more of the rotating structures of the turbofan engine 10 through one or more respective bearing assemblies. For example, with reference to the low-speed spool 36, the turbofan engine 10 may generally include a first bearing assembly 216 and a second bearing assembly 218. The first bearing assembly 216 supports the forward low-speed connection member 120 (and thus the fan 40 and low speed spool 36) and is supported by the forward strut 208. The first bearing assembly 216 includes a single ball bearing supporting the forward low speed support member 120 for the embodiment shown. The second bearing assembly 218 supports the low-speed spool 36 through a low-speed spool extension 220 and is supported by the turbine rear strut 214. The second bearing assembly 218 depicted includes a roller bearing and a ball bearing (it being understood, however, that generally only one of the first or second bearing assemblies 216, 218 would include a ball bearing). However, in other embodiments, the second bearing assembly 218 may include any other configuration of bearings, and further may be positioned at any other suitable location (e.g., forward of the rotor 88, on opposing sides of the rotor 88, etc.).

Further, with reference to the intermediate-speed spool 34, the turbofan engine 10 generally includes a third bearing assembly 222, a fourth bearing assembly 224, and a fifth bearing assembly 226. The third bearing assembly 222 supports the intermediate-speed spool 34 at a location forward of the gearbox 104 (and inward of, or forward of, the LP compressor 24) and is supported by the frame member 128 mounting the gearbox 104, which is, in turn, supported by the compressor center strut 210. For the embodiment shown, the third bearing assembly 222 is depicted as including a single a roller bearing. The fourth bearing assembly 224 supports the intermediate-speed spool 34 at a location aft of the gearbox 104 and forward of the HP compressor 26, and is similarly supported by the frame member 128 and compressor center strut 210. For the embodiment shown, the fourth bearing assembly 224 is depicted as including two bearings spaced along the axial direction, and more specifically, a forward, roller bearing 224' and an aft, ball bearings 224". The fifth bearing assembly 226 supports the intermediate-speed spool 34 within the turbine section and is supported by the turbine center strut 212. For the embodiment shown, the fifth bearing assembly 226 is depicted as including a single roller bearing. It should be appreciated, however, that generally only one of the third, fourth, or fifth bearing assemblies 222, 224, 226 would include a ball bearing (multiple ball bearings are depicted to show non-limiting options for placement of such ball bearing).

Further, still, with reference to the high-speed spool 38, the turbofan engine 10 additionally includes a sixth bearing assembly 228 supporting the high-speed spool 38 within the turbine section and also supported by the turbine center strut 212. For the embodiment depicted, the sixth bearing assembly 228 is depicted as including a single ball bearing, but may also include, in other embodiments, a roller bearing as well.

Notably, for the exemplary embodiment depicted, the turbomachine 16 further includes one or more differential bearing assemblies for supporting the rotating components of the turbofan engine 10. For example, for the embodiment shown, the turbofan engine 10 includes a first differential bearing assembly 230, the first differential bearing assembly 230 including a bearing 230' positioned between the low-speed spool 36 and the intermediate-speed spool 34 at a location forward of the gearbox 104, and a bearing 230" at a location aligned with, or aft of the gearbox 104. More specifically, the bearing 230', which for the embodiment shown is a roller bearing, is positioned between the intermediate-speed spool 34 and the low-speed spool 36 and is substantially aligned with a bearing of the third bearing assembly 222 along the axial direction A. Notably, as used herein, the term "substantially aligned" refers to one bearing having at least a portion overlapping with at least a portion of the other bearing. However, in other embodiments, the bearing 230' of the first differential bearing assembly 230 may not be substantially aligned with a bearing of the third bearing assembly 222 along the axial direction A.

In such a manner, it will be appreciated that the compressor center frame 200 may be utilized to support rotation of the fan 40 (more specifically to support the frame member 128, the intermediate speed spool 34 through the third bearing assembly 222, and the low-speed spool 36 through the first differential bearing assembly 230).

In addition, the exemplary turbofan engine 10 depicted includes a second differential bearing assembly 232 positioned between the high-speed spool 38 and the intermediate-speed spool 34 at a location inward of the HP compressor 26. For the embodiment shown, the second differential bearing assembly 232 is configured as a roller bearing.

It will be appreciated that the exemplary bearing configuration provided in FIG. 5 is provided by way of example only. In other exemplary embodiments, any other suitable bearing configuration may be provided. For example, in other embodiments, the exemplary turbofan engine 10 may not include each of the bearing assemblies described above and depicted in the Figures. For example, in other embodiments, the turbofan engine 10 may not include the first bearing assembly 216. With such a configuration, the turbofan engine 10 may further omit the forward frame 202, or may reduce a size of the forward frame 202. With such a configuration, the first differential bearing assembly 230 may substantially completely support a rotation of the fan 40. Further, in other exemplary embodiments, the bearing assemblies described herein may not include the number and/or configuration of bearings depicted. For example, although certain bearing assemblies are depicted including a single ball bearing, a single roller bearing, or a combination of a roller bearing and a ball bearing, in other embodiments, such bearing assemblies may alternatively include any other combination, or further may include any other suitable type of bearing, such as a tapered roller bearing, an air bearing/gas bearing, etc.

Generally, it will be appreciated that the exemplary turbofan engine 10 described above with reference to FIGS. 1 through 5 is provided by way of example only. In other exemplary embodiments, any other gas turbine engine configuration may be provided. For example, in certain exemplary embodiments, one or more of the LP compressor 24, HP compressor 26, or LP turbine 30 may include any suitable mounting configuration for the counterrotating, different speed rotor blades provided. Additionally, or alternatively, although the HP compressor 26 and LP turbine 30 are depicted as a counterrotating HP compressor and counterrotating LP turbine, respectively, in other embodiments, other suitable HP compressors and/or LP turbines may be provided (e.g., the HP compressor 26 may be setup as a separate intermediate pressure compressor and high pressure compressor; similarly the LP turbine 30 may be setup as a separate intermediate pressure turbine and low pressure turbine). Similarly, although the HP turbine 28 is depicted as a single stage HP turbine 28, in other embodiments, the HP turbine 28 may include any other suitable number of stages, may also be a counterrotating HP turbine 28, etc. Further, still, in other embodiments, the turbofan engine 10 may include any other suitable number or arrangement of compressors, turbines, etc.

It will further be appreciated that although the turbofan engine 10 is depicted as a ducted turbofan engine, in other exemplary embodiments, aspects the present disclosure may be incorporated into any other suitable turbomachine 16 and gas turbine engine, such as an un-ducted turbofan engine, a turboprop engine, a turbojet engine, a turboshaft engine, etc. Further, still, although depicted as an aeronautical gas turbine engine, in other exemplary embodiments, aspects of the present disclosure may be incorporated into any other suitable gas turbine engine, such as an aeroderivative gas turbine engine (e.g., a nautical gas turbine engine), an industrial gas turbine engine, etc.

Moreover, it will be appreciated that in still other exemplary embodiments of the present disclosure, the turbofan engine 10 may not include each of the features described herein, and/or alternatively, may include additional features not described herein. For example, referring now briefly to FIG. 6, a close-up, schematic view is depicted of a turbine section of a turbomachine 16 of a turbofan engine 10 in accordance with another exemplary embodiment of the present disclosure. The exemplary turbomachine 16 depicted in FIG. 6 may be configured in substantially the same manner as the exemplary turbomachine 16 described above with reference to FIGS. 1 through 5. Accordingly, the same or similar numbers may refer to the same or similar part.

Figure 6:
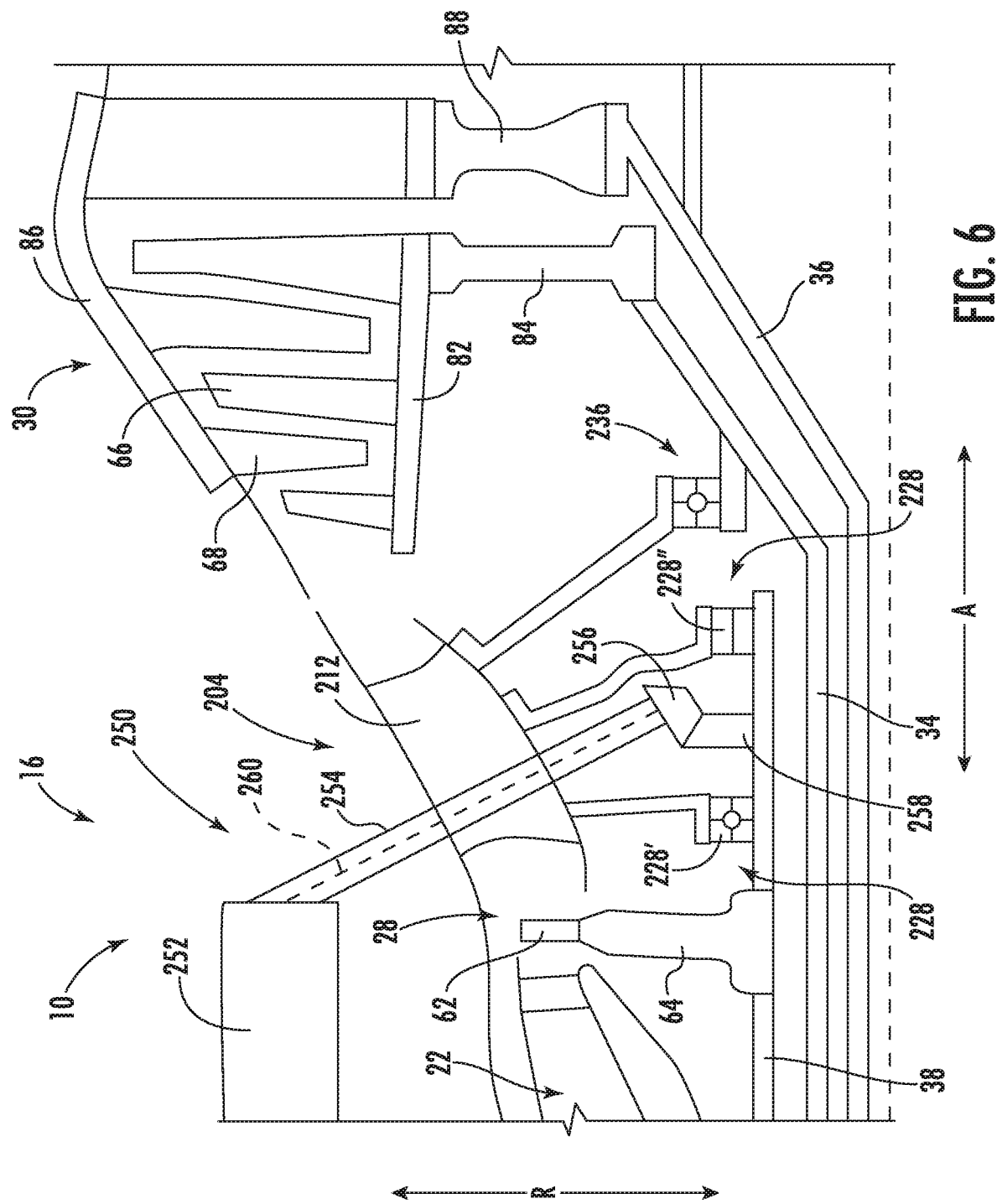
FIG. 6 is a close-up, schematic, cross sectional view of a turbine section of a gas turbine engine in accordance with another exemplary embodiment of the present disclosure.

Although the exemplary turbomachine 16 may otherwise be configured in substantially the same manner as exemplary turbomachine 16 described above with reference to FIGS. 1 through 5, the turbomachine 16 depicted in FIG. 6 further includes an accessory drive system 250. The accessory drive system 250 generally includes an accessory gearbox 252 and an accessory drive member 254 for powering the accessory gearbox 252. The accessory drive member 254 extends generally from the accessory gearbox 252 through the turbine center frame 204, and more specifically, through the turbine center strut 212 of the turbine center frame 204. The accessory drive member 254 further includes a bevel gear 256. Similarly, the high-speed spool 38 includes a bevel gear 258. The bevel gear 258 of the high-speed spool 38 meshes with the bevel gear 256 of the accessory drive member 254 for rotating the accessory drive member 254 about a longitudinal axis 260 of the accessory drive member 254. In such a manner, power may be extracted from the high-speed spool 38 and provided to the accessory gearbox 252 during operation of the turbofan engine 10. Also, power may be delivered to the high-speed spool 38 to, e.g., start the engine.

It will be appreciated that for the embodiment shown, the accessory gearbox 252 may be positioned within a casing 18 of the turbomachine 16 (see FIG. 1). However, in other embodiments, the accessory gearbox 252 may be positioned at any other suitable location. Also, it should be appreciated that for the embodiment shown, the sixth bearing assembly 228 generally includes a first bearing 228' positioned forward of the bevel gear 258 of the high-speed spool 38 and a second bearing 228" positioned aft of the bevel gear 258 of the high-speed spool 38. For the embodiment shown, one of the first bearing 228' or second bearing 228" is configured as a ball bearing and the other of the first bearing 228' or second bearing 228" is configured as a roller bearing. More particularly, for the embodiment shown, the first bearing 228' is a ball bearing and the second bearing is a roller bearings 228". However, in other embodiments, other configurations may be provided.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Further, components described herein and shown in the Figures are of one embodiment, and in other embodiments may be included with other suitable component. As such, it should be appreciated that no group of components described herein and depicted in the Figures is inextricably linked unless expressly disclosed as such.

What is claimed is:

1. A gas turbine engine defining an axial direction and comprising:
   a turbine section comprising a turbine having a plurality of first speed turbine rotor blades;
   a compressor section comprising a compressor having a plurality of first speed compressor rotor blades and a plurality of second speed compressor rotor blades, the plurality of first speed compressor rotor blades alternatingly spaced with the plurality of second speed compressor rotor blades along the axial direction;
   a fan section comprising a fan; and
   a first spool rotatable by the plurality of first speed turbine rotor blades and coupled to the plurality of first speed compressor rotor blades for driving the plurality of first speed compressor rotor blades, coupled to the plurality of second speed compressor rotor blades for driving the plurality of second speed compressor rotor blades, and coupled to the fan for driving the fan,
   wherein the turbine further comprises a plurality of second speed turbine rotor blades,
   wherein the plurality of first speed turbine rotor blades are alternatingly spaced with the plurality of second speed turbine rotor blades along the axial direction,
   wherein the gas turbine engine further comprises a second spool coupled to and rotatable with the plurality of second speed turbine rotor blades and the fan for driving the fan,
   wherein the plurality of second speed compressor rotor blades are further coupled to the fan for driving the fan.

2. The gas turbine engine of claim 1,
   wherein a forward-most stage of the plurality of second speed compressor rotor blades is a forward-most stage of compressor rotor blades of the compressor section and an aft-most stage of the plurality of second speed compressor rotor blades is an aft-most stage of the compressor rotor blades of the compressor section,
   wherein the forward-most stage of compressor rotor blades is coupled to the fan, and
   wherein the aft-most stage of compressor rotor blades is directly coupled to a gearbox so as to be coupled to the first spool through the gearbox.

3. The gas turbine engine of claim 1,
   wherein the plurality of first speed turbine rotor blades is a plurality of intermediate speed turbine rotor blades,
   wherein the plurality of first speed compressor rotor blades is a plurality of intermediate speed compressor rotor blades, and
   wherein the plurality of second speed compressor rotor blades is a plurality of low-speed compressor rotor blades.

4. The gas turbine engine of claim 1, further comprising:
   a compressor frame member positioned downstream of the compressor;
   a support member coupled to the compressor frame and coupled to a gearbox;
   a first bearing positioned between the support member and the first spool for supporting the first spool; and
   a second bearing positioned between the first spool and the second spool and substantially aligned with the first bearing along the axial direction of the gas turbine engine.

5. The gas turbine engine of claim 1,
   wherein the compressor is a low pressure compressor,
   wherein the compressor section further comprises a high pressure compressor positioned downstream of the low pressure compressor, wherein the high pressure compressor comprises a plurality of first speed HP compressor rotor blades and a plurality of third speed HP compressor rotor blades, and wherein the plurality of first speed HP compressor rotor blades is coupled to the first spool.

6. The gas turbine engine of claim 5, wherein the turbine is a low pressure turbine, wherein the turbine section further comprises a high pressure turbine, wherein the high pressure turbine comprises a plurality of third speed HP turbine rotor blades, and wherein the gas turbine engine further comprises:
a third spool rotatable by the plurality of third speed HP turbine rotor blades, the third spool coupled to the plurality of third speed HP compressor rotor blades for driving the plurality of third speed HP compressor rotor blades.

7. The gas turbine engine of claim 6, wherein the plurality of third speed HP compressor rotor blades and the plurality of first speed HP compressor rotor blades are alternatingly spaced along the axial direction of the gas turbine engine.

8. The gas turbine engine of claim 5, wherein the turbine is a low pressure turbine, wherein the turbine section further comprises a high pressure turbine, and wherein the gas turbine engine further comprises:
a third spool rotatable by a plurality of third speed HP turbine rotor blades; and an accessory drive system comprising an accessory gearbox and an accessory drive member, the accessory drive member drivingly coupled to the high pressure turbine at a location aft of the high pressure turbine.

9. The gas turbine engine of claim 1, wherein the plurality of first speed turbine rotor blades is configured to rotate in an opposite circumferential direction than the plurality of second speed turbine rotor blades.

10. The gas turbine engine of claim 1, further comprising a gearbox, wherein an entirety of the gearbox is disposed radially inward of the plurality of first speed compressor rotor blades and the plurality of second speed compressor rotor blades.

11. The gas turbine engine of claim 1, further comprising a second speed connection member extending from the plurality of second speed compressor rotor blades in a forward axial direction to a fan disk on which the fan is disposed.

* * * * *